United States Patent
French et al.

(10) Patent No.: US 6,882,290 B2
(45) Date of Patent: Apr. 19, 2005

(54) METHOD AND SYSTEM FOR DYNAMICALLY PERSONALIZING TRANSPORTATION IN A VEHICLE

(75) Inventors: Kevin French, Almonte (CA); Chris Coleridge, Kanata (CA); Peter Kinsella, Gloucester (CA); Michael Chawner, Ashton (CA); David Levy, Almonte (CA); David Schenkel, Ottawa (CA); Travis Gray, Ottawa (CA); Gyles Panther, Ottawa (CA)

(73) Assignee: Mobile Knowledge Inc., Kanata (CA)

( * ) Notice: Subject to any disclaimer, the term of this patent is extended or adjusted under 35 U.S.C. 154(b) by 0 days.

(21) Appl. No.: 10/323,945

(22) Filed: Dec. 20, 2002

(65) Prior Publication Data

US 2004/0119589 A1 Jun. 24, 2004

(51) Int. Cl.⁷ .............................................. G08G 1/123
(52) U.S. Cl. .................... 340/988; 340/905; 340/995.1; 340/539.13; 340/990; 340/531; 340/539.1; 705/417; 705/14; 705/6; 701/200; 707/3; 707/10
(58) Field of Search ................................. 340/988, 905, 340/990, 995.1, 539.1, 539.13, 539.11, 539.16, 539.17, 989, 995.16, 691.6, 405.5, 825.28, 825.29; 705/5–6, 14, 417; 701/200–225; 707/3, 10

(56) References Cited

U.S. PATENT DOCUMENTS

| | | | |
|---|---|---|---|
| 5,614,898 A | * 3/1997 | Kamiya et al. | 340/995.24 |
| 5,627,549 A | 5/1997 | Park | |
| 5,664,948 A | 9/1997 | Dimitriadis et al. | |
| 5,973,619 A | * 10/1999 | Paredes | 340/994 |
| 6,014,090 A | * 1/2000 | Rosen et al. | 340/905 |
| 6,060,993 A | 5/2000 | Cohen | |
| 6,133,853 A | * 10/2000 | Obradovich et al. | 340/905 |
| 6,236,330 B1 | 5/2001 | Cohen | |
| 6,343,317 B1 | * 1/2002 | Glorikian | 709/218 |
| 6,356,838 B1 | * 3/2002 | Paul | 701/209 |
| 6,529,136 B1 | * 3/2003 | Cao et al. | 340/686.1 |
| 6,741,188 B1 | * 5/2004 | Miller et al. | 340/995.1 |
| 2002/0032771 A1 | 3/2002 | Gledje | |
| 2002/0091568 A1 | 7/2002 | Kraft et al. | |
| 2002/0164962 A1 | * 11/2002 | Mankins et al. | 455/99 |
| 2003/0006911 A1 | * 1/2003 | Smith et al. | 340/988 |
| 2003/0036829 A1 | * 2/2003 | Shioda | 701/23 |
| 2003/0144906 A1 | * 7/2003 | Fujimoto et al. | 705/14 |
| 2004/0117332 A1 | * 6/2004 | Himebaugh | 705/417 |

* cited by examiner

Primary Examiner—Benjamin C. Lee
(74) Attorney, Agent, or Firm—Freedman & Associates

(57) ABSTRACT

A method for dynamically personalizing transportation in a vehicle comprises the steps of providing a vehicle including a messaging device for displaying messages, providing a central dispatch system for managing passenger allocation to the vehicle, receiving passenger specific information at the dispatch system, providing data relating to the passenger specific information from the dispatch system to the messaging device, and selecting and displaying a message based on the data for display. Further, a method is disclosed in which messages depending on passenger specific information, and messages independent form passenger specific information are selected and displayed. The messaging device is in communication with a video display unit or with a printing device for displaying messages received.

72 Claims, 6 Drawing Sheets

METHOD AND SYSTEM FOR DYNAMICALLY PERSONALIZING TRANSPORTATION IN A VEHICLE

FIELD OF THE INVENTION

The instant invention relates generally to a method for dynamically personalizing transportation in a vehicle, and more specifically to a method for displaying advertisements within a rental vehicle.

BACKGROUND OF THE INVENTION

Advertising has become an integral part of information exchange in today's modern societies, and plays an active role in the dissemination of knowledge relating to new and advanced products, ultimately leading to an improved lifestyle of a member of a given society. In many cases, an advertisement is received as valuable information, providing new ideas and insights, and is often regarded as being helpful, and even entertaining. However, in certain instances, the benefits of advertising turn out to be its curse. An advertising message is likely considered annoying and bothersome, if received by someone not being a member of an intended target audience. The advertisement then achieves the opposite effect as initially intended. Therefore, a common trend developing in advertising is personalized advertising, providing tailor-made advertisements for a specific audience. The ultimate goal of this personalization is to engender traits and characteristics within a highly targeted advertising communication model thereby generating more successful sales.

Another current trend in advertising is to incorporate advertising media into vehicles, and especially into rental vehicles such as taxis, limousines, black cars, and the like. Several systems have come to the market during the last twelve months. For example, "Cabvision" (www.cabvision.com) has combined the latest screen and computer technology to create mobile "broadcast style" media within a taxi. This presents advertisers with a significant opportunity to reach a captive audience. "Taxi Vision" (www.taxiviz.com) has pioneered a new advertising medium designed to deliver video advertisements to consumers in a unique and captive environment, namely the back seat of a taxicab. This environment offers the possibility to deliver a message to a high-quality audience with little distractions. A similar approach is pursued by "toMarket" (www.tomarket.ca), which has equipped a fleet of city taxis with video screens that provide GPS technologies to the passengers. By using a touch-screen attached to a headrest of a front passenger seat, passengers are able to follow along with the driver, and local businesses get prime advertising space as participating companies advertisements pop up on the screen as the taxi passes by their specific location.

With reference to rental vehicles, such as taxis, the systems as described above, which are referred to as video display systems, are to be classified as non-integrated or standalone systems. A nonintegrated system operates by itself and independently from any other services employed in the operation of a rental vehicle, such as a dispatch system. Contrary to the standalone system, an integrated system infers that at least two systems are linked and optionally share knowledge such as passenger details, rider ship details, vehicle location, pickup, destination, and the like. The integrated solution combines for example video display techniques with dispatch techniques. This interaction between the two systems allows for personalizing transportation in a vehicle equipped with an integrated solution system, in that passenger specific messages are displayed during a journey in that vehicle. The dispatch system for example provides information regarding a passenger's destination, and the video display system displays advertisements and information related to this particular destination. This way, the journey in a vehicle equipped with an integrated solution becomes an integrated part of the destination itself.

Furthermore, the passenger is in many cases committed to an advertising system. He or she does not have the possibility to influence the display of advertisement at will, for example requiring more detailed information about a subject of special interest to the passenger. This aspect of non-interactivity is another characteristic often encountered in standalone advertising systems.

It would be highly advantageous to provide a method for an integrated approach combining video display services with other services, such as dispatch services, in order to personalize and enhance the experience of traveling in a vehicle equipped with a video display system and another system, such as a dispatch service. It would be of further advantage to integrate interactive approaches into an integrated video display and dispatch solution.

SUMMARY OF THE INVENTION

In accordance with an aspect of the instant invention, there is provided a method for dynamically personalizing transportation in a vehicle. A vehicle is provided, the vehicle comprising a messaging device for displaying messages, for storing messages, and for storing information relating to messages displayed, and a wireless communication device for receiving and sending messages, the wireless communication device in communication with the messaging device. Further provided is a dispatch system for managing passenger allocation to the vehicle, the dispatch system in communication with the wireless communication device, and a data storage medium in communication with the dispatch system. The method further includes the steps of receiving passenger specific information at the dispatch system, providing data relating to the passenger specific information from the dispatch system to the messaging device via wireless communication and the wireless communication device, selecting at least a message based on the data for display on the messaging device; and displaying the at least a message on the messaging device.

In accordance with another aspect of the instant invention, there is provided another method for dynamically personalizing transportation in a vehicle, comprising the steps of providing a vehicle comprising a messaging device for displaying messages, for storing messages, and for storing information relating to messages displayed, providing passenger specific information to the messaging device, selecting at least a message based on the passenger specific information for display on the messaging device, selecting at least another message independent from the data, and displaying the at least a message and the at least another message on the messaging device.

In accordance with yet another aspect of the instant invention, there is provided a method for dynamically personalizing transportation in a vehicle. A vehicle is provided comprising a messaging device for storing messages, for selecting messages, and for storing information relating to messages selected. The method further comprises the steps of selecting at least a message with the messaging device, providing a printing device in communication with the messaging device, providing the at least a message from the messaging device to the printing device, and printing the at least a message provided from the messaging device to the printing device on the printing device.

In accordance with an aspect of the instant invention, there is further provided a system for personalizing transportation in a vehicle. The system includes a vehicle comprising a messaging device for storing, selecting, and displaying messages. The system also includes a central message management system comprising central administration software and central database software, the central message management system for storing messages and providing at least a message to the messaging device; and a wireless communication device, the wireless communication device in communication with the messaging device. The system further includes a dispatch system for sending information to the messaging device, the dispatch system in communication with the wireless communication device, the information for selecting messages to be displayed on the messaging device, and for providing real time content to the messaging device.

BRIEF DESCRIPTION OF THE DRAWINGS

Embodiments of the present invention are now described with reference to the following figures, in which.

DETAILED DESCRIPTION OF THE INVENTION

Figure 1:
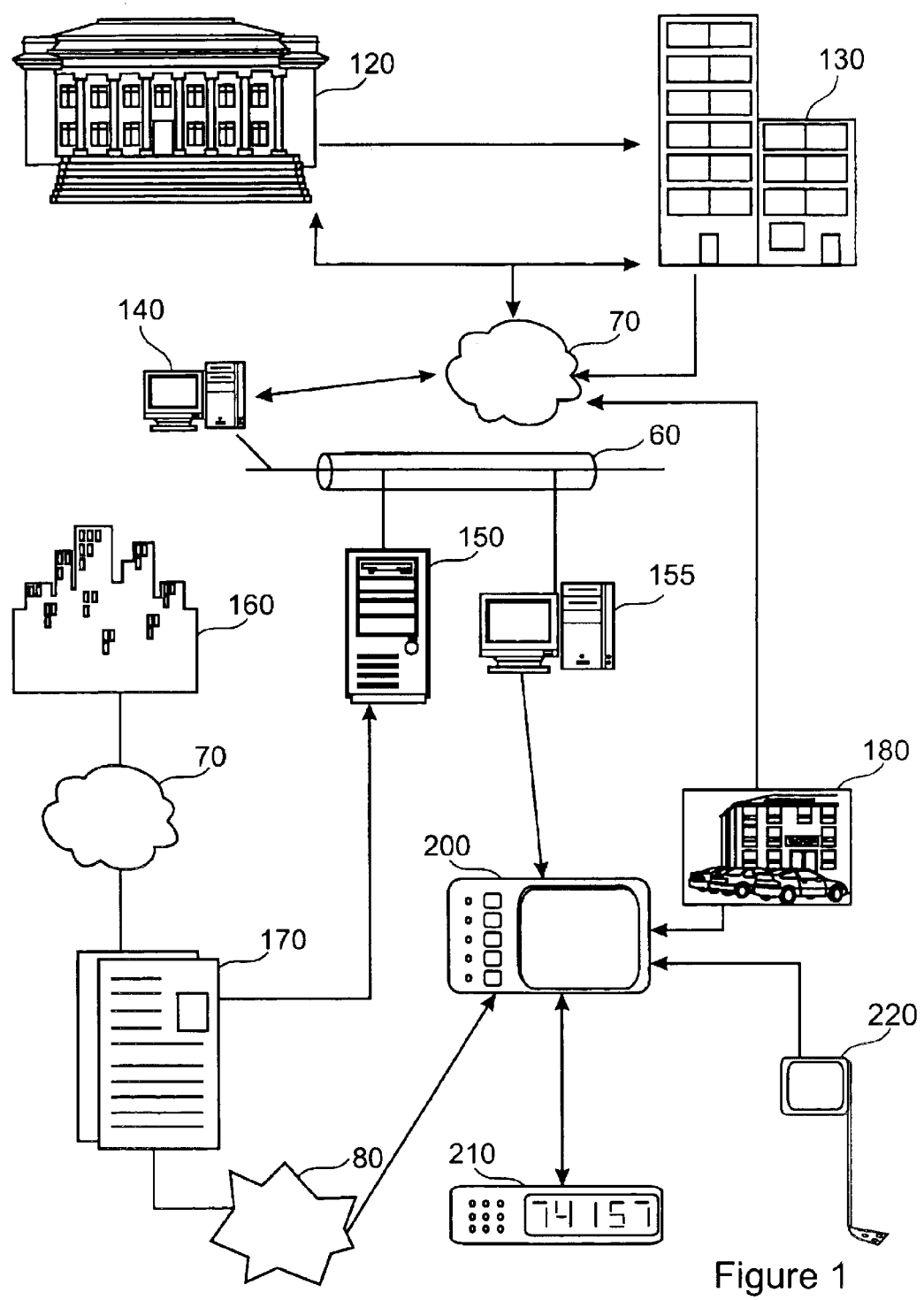
FIG. 1 displays a schematic diagram of an integrated Multi Media/Dispatch Solution.

The present invention is now described with reference to a particular messaging system system, the Multi Media (MM) system. However, the present invention is not intended to be restricted to an MM system, but equally applies to any type of messaging system, used in a vehicle.

When employed in a rental vehicle such as a taxi, black car, or limousine, the MM-system is favorably combined with a dispatch system. Many distinct advantages are associated with an integrated MM/dispatch solution (IMMDS). With IMMDS targeted advertising becomes possible, since the dispatch system is able to provide specific demographic information about a passenger of a rental vehicle, such as passenger type, home address, pickup address, destination address, and payment method. The dispatch system optionally provides ridership details, such as a passenger's history. Furthermore, the IMMDS in many cases comprises a printer. An advertiser is optionally provided with the ability to add information to a passenger's paper receipt. This is optionally used for advertising, for providing coupons, or for related services. Also, the dispatch system is able to show trip information and cost information on a display of the Multi Media system, making it easier for a passenger to confirm details of a trip. The dispatch system optionally triggers the advertising system to play a special greeting message, when a passenger boards or departs a rental vehicle. Of course, optionally, the use of the passenger doors or some other mechanism is used to trigger the advertising system to play a special greeting message. For example, resetting of the fare meter could trigger the advertising system. Further, the dispatch system has knowledge of the driver of a rental vehicle. Thus, it is possible to display the driver's picture and the driver's personal details on the display of the MM-system. During a journey, a passenger is optionally presented with a map of where he or she was picked up, the progress to date, and the destination, if the related information is captured by the dispatch system. Thus, customers are able to verify whether they are being taken to the correct location on a direct route. Also, the passenger is optionally presented with the exact details of the trip, such as toll, phone, and stop charges. This in turn enables possibilities for a paperless voucher system. In cases, where regulations exist requiring that a passenger is provided the capability to prevent the display of advertising messages, the IMMDS allows the dispatch system to automatically re-enable an advertising unit of the MM-system once the trip has ended. Even further, advertising statistics are optionally sent back to a potential advertiser, the statistics comprising end-of-trip details. The potential advertiser is provided with information regarding an audience and viewing details of an advertisement, providing the advertiser with an ability to more effectively select and design advertisements. Since for example flight details are often captured as part of trip details relating to an airport destination, the dispatch system optionally monitors flight departure times, and notifies a passenger directly on an MM-system display. In case of flight delay or cancellation, a passenger has the opportunity to directly change the details of her his trip, and for example takes extra time to go shopping.

Referring now to FIG. 1, system components of the IMMDS for displaying advertisements are described in detail. An Advertiser 120 selects an advertisement, and places the advertisement with an Advertising Agency 130. The Advertiser 120 is for example a company willing to place advertisements on IMMDS. Typically, the Advertiser 120 generates advertising media content. Alternatively, the advertiser 120 instructs the Advertising Agency 130 to prepare advertising media content. The Advertising Agency 130 uploads media content, as for example advertisement images and/or text, and setup details for the advertisement to a Central Advertising Site 140. The Central Advertising site 140 and the dispatch are in communication with a common network 70, such as the Internet, and the step of uploading images and set-up details is optionally performed through the common network. Preferably, communication is possible between the Advertiser 120, the Advertising Agency 130, and the Central Advertising Site 140 via the common network 70. The advertiser 120 is provided with an ability to monitor the placement of her or his advertisement via the Central Advertising site 140. Preferably, the Central Advertising Site 140 is a trusted World Wide Web (WWW) site allowing the advertiser 120 to view the location of the media content in the overall system. For example, the Advertiser 120 monitors the media designated for playing before and after his or her media. Further, the interaction between the Advertiser 120, the Advertising Agency 130, and the Central Advertising Site 140 provides the Advertiser 120 with indications of a number of vehicles and cities that are playing his or her advertisement, and an approximate play time to passengers. Preferably, the indications are in the form of useful statistical data.

The Central Advertising Site 140 is further connected to an advertisement provider local area network (AP-LAN) 60. Further connected to AP-LAN 60 are a Central Advertising System 150 and an Advertisement Administrator 155. The Central Advertising System 150 houses and stores the information with respect to the setup and operation of the MM-system. Typically, the Advertisement Administrator 155 is responsible for approving the media content that will play on the Multi-Media system. Optionally, the Advertisement Administrator 155 classifies the advertisements according to content data. Further optionally, based on content data, the Advertisement Administrator 155 assigns a passenger class to an advertisement. The Advertisement Administrator 155 is further responsible for delivering appropriately prepared media content to the MM-system display devices. This is, for example, accomplished through the use of compact flash media, or through the use of a wireless mechanism.

A Customer 180 of the MM-system is connected to the Central Advertising Site 140 through the common network 70. Typically, the Customer 180 is a local "for hire" company, maintaining a fleet of rental vehicles, such as taxis, limousines, black cars, and the like. Typically, a rental vehicle is equipped with a wireless communication device (not shown) and with an MM-system messaging device 200. The MM-system messaging device 200 is coupled to the Customer 180, who provides customer specific information such as for example customer logos, driver identification, and map information, to the MM-system messaging device 200. Further, the Advertisement Administrator 155 provides advertising information to the MM-system messaging device 200. The information delivered to the MM-system messaging device 200 is for example provided by compact flash media, or by use of the wireless communication device. Optionally, the MM-system messaging device is coupled to a meter device 210 of a rental vehicle when the vehicle is for metered use. If the vehicle is equipped with a smart meter that supports serial communications to the MM-system messaging device 200, the MM-system messaging device 200 optionally extracts trip details for use within the MM system, for example to indicate an anticipated trip cost to a customer.

Further optionally, the MM-system messaging device 200 is coupled to a passenger seat display 220. The passenger seat display 220 for example comprises a video display unit (VDU) adjustably mounted to a floor section of a rental vehicle for aligning a normal direction vector of the video display unit with a direction of view of a passenger positioned in a passenger seat. Optionally, the VDU comprises means for a passenger to disable the VDU. Optionally, the MM-system messaging device 200 enables a previously disabled VDU. A person skilled in the art of display manufacture will easily envision other types of passenger seat displays 220. Optionally, the MM-system messaging device 200 comprises a wireless communication circuit. Further optionally, the MM-system messaging device 200 comprises a GPS module.

The MM-system messaging device is optionally coupled to other devices for displaying messages. The MM-system is for example coupled to a video display unit that is not part of a passenger seat display. Also, the MM-system messaging device is optionally coupled to an audio display device.

In another embodiment of the instant invention, the MM-system messaging device is coupled to a printing device. The messages for display on the MM-system messaging device 200 are printed on the printing device. Typically these messages contain advertisements relating to a passenger destination, advertisements combined with a map portion, advertisements containing coupons, and the like. However, the messages printed on the printing device are not limited to the examples given above.

Further, optionally, the MM-system is coupled to more than one message display device. For example, the MM-system messaging device is for use with a video display unit in conjunction with a printing device. Messages are displayed independently on both message display devices the video display unit and the printing device. Optionally, messages displayed on the printing device are displayed in dependence on messages displayed on the video display unit.

Also part of the IMMDS is a dispatch system 170. The dispatch system 170 is used to transmit "live" information gathered from information sources 160 and to provide the MM-system messaging device 200 with demographic information about the passenger. This way, the central dispatch system performs a step of passenger allocation. Optionally, the central dispatch system 170 comprises data memory storage. Information sources 160 typically deliver real time content to the MM-system, such as for example weather, news, sports, traffic, stocks, and airport information. The communication between the dispatch system 170 and the MM-system messaging device 200 takes place for example via a wireless network 80. The dispatch system 170 also collects MM statistical information for the Central Advertising system 150. In this way, an advertiser can monitor a display frequency and an audience profile for her or his messages displayed by the MM-system. Further optionally, the dispatch system 170 is provided with demographic information relating to a passenger, and transmits the demographic information to the MM-system messaging device 200. The demographic information is used to select advertisements to be played on the MM-system messaging device 200. Advantageously, current dispatch practices in the art already collect passenger specific information such as flight details, passenger destination, passenger age or work level, and event related information.

Figure 2:
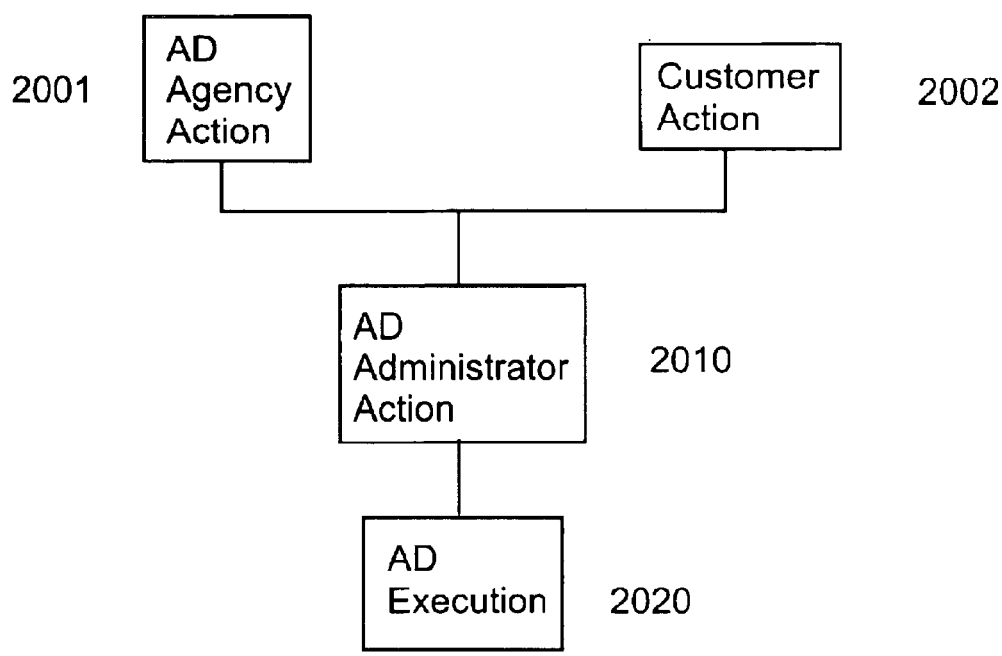
FIG. 2 shows a chart of operation for creating media content for a Multi Media system.

The MM-system messaging device 200 comprises a dynamic mobile media reel (DMMR). The MM-system messaging device 200 in a vehicle dynamically generates DMMR. DMMR determines what a passenger is seeing on the passenger seat display 220. Referring now to FIG. 2, shown is a chart of operation illustrating the main steps in creating media content for a MM-system. In step 2001, the Advertising Agency 130 sells media space, generates media, and delivers media and setup to the Central Advertising Site 140. In step 2002, the Customer 180 creates company specific information media containing for example intro and exit loops, and delivers the media and setup to the Central Advertising Site 140. In step 2010, the Advertisement Administrator 155 combines advertising media and customer media, validates media information, and distributes media to the customer 180. In step 2020, the Customer 180 loads the combined media into rental vehicles, for display on the MM-system messaging device 200.

Figure 3A:
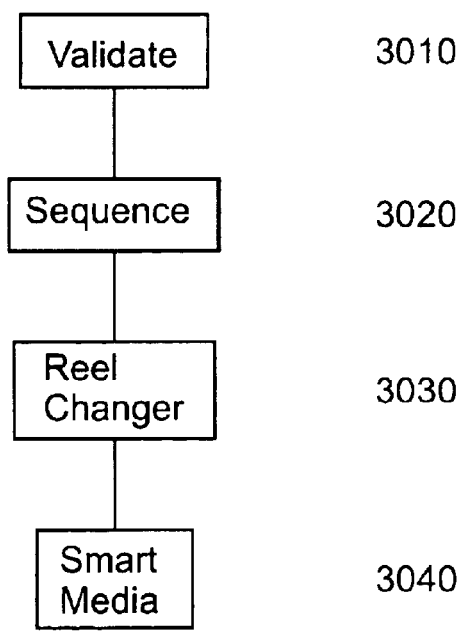
FIG. 3a displays a schematic diagram of a procedure of creating a dynamic mobile media reel.

Referring now to FIG. 3a, shown is a schematic diagram of a procedure of creating DMMR within the MM-system messaging device 200. In the following, the MM-system messaging device 200 will also be referred to as MM-player. In order to support DMMR, the MM-player comprises appropriate storage media to store messages, such as advertisements and the like, but not restricted to advertisements, as well as information related to certain messages. The different steps of the procedure outlined in FIG. 3a comprise a validation step 3010, a sequencing step 3020, a reel changer step 3030, and a smart media generation step 3040. Each media item consists of actual media content and a description file that contains its properties. The properties for media items are described in the following. Media ID describes a unique ID identifying the media item, or media. Media File Name describes the file that contains the media and its properties. Play Duration contains the number of seconds that the media is supposed to play. Start Date and Stop Date specify the dates that the media is supposed to begin and stop playing. Time Range classifies, within a time frame defined by Start Date and Stop Date, a time for which the media should be shown. For example, the media is played only during the evenings. If no time range is specified, the media optionally plays at any time within the defined time frame. Location and Radius determines a location and its radius for where the media is to be shown. For example, the media is shown only when the vehicle is within 3 km of a given landmark. If no location is specified, the media plays at any time, within the defined time frame. Typically, a GPS system is used when assigning the property "radius and location". Similarly "location and radius" optionally applies to the display of maps, describing a portion of a map to be shown on the MM-system messaging device 200. Type allows the MM player to interpret various media appropriately. It is also used to apply the specified constraints. The following are examples of media type properties: still image, flash, streaming video, audio, and smart media. Also, the MM player in a vehicle dynamically generates smart media. Mapping, weather, and driver pictures are examples of smart media type properties. Category is used to classify the media within each type. Categories are identical for all types with the exception of the smart media. The following are examples of common categories: Restaurant, Hotel, Adult, Beverage, General, Travel, Retail, and Filler. The following are examples of smart media categories: Map, Meter Info, Weather, Driver Photo, Sports, and News. Of course, the instant invention is not restricted to the categories mentioned, but equally applies to other categories as well. Constraints are used to automatically distance media from conflicting media messages. For example, advertising messages for competing products are not to be scheduled to play contiguously The Reel property specifies when the media will play. For example, the reel properties are optionally defined as normal, intro, and exit. The "normal reel" property specifies that the media runs by default. The "intro reel" property specifies that the media runs as soon as a passenger boards the vehicle, whereas "exit reel" specifies that the media runs when the passenger is preparing to depart the vehicle. Demographic Details allow the MM player to target media at specific passengers. The following are examples of various demographic attributes: Male, Female, Senior, Adult, Youth, Business, Personal, Vacation, Low Income, Medium Income, High Income. The property field Sequence Number is used to specify the order that the media will be shown in the intro and exit reels, and the property Repeat signals the MM player that the media should be repeated in the reel. The "repeat" field is a numeric field representing the number of times the media is supposed to be repeated. A person of skill in the art easily envisions other properties for media items.

In the validation step 3010, media items are added to or removed from DMMR. In order for any media to be played, it passes through a predefined logic of a validation test. This validation test is run periodically. For example, the validation test is run every 5 seconds. It will test each media item and will add or remove the media item from a play list of the DMMR.

In the sequencing step 3020, a play order is established based upon priority and media constraints. Once a media item has been added to the play list, it is sequenced properly within the appropriate DMMR. Two possible sequencing criteria are media priority and media constraints. The MM player determines the media priority automatically. For example, the MM player assigns priority levels Extreme>High>Medium>Low based upon an element hierarchy Location>Demographics>Time>Open. Thus, when a media has been inserted into the reel based on a certain location, it receives utmost priority when the vehicle enters the particular location. Similar, when demographics for a passenger are available, media items that match the demographic information will receive a higher priority than media items that do not match the demographic information. Demographics of a passenger include personal data, personal preferences, and passenger history, among others.

In the reel changer step 3030, the DMMR switches between different media content, for example from advertising content to a personalized intro loop when a passenger is boarding a vehicle. Typically, the MM player comprises a reel changer. Upon detecting the boarding of a passenger, the reel changer interrupts a normal reel with an intro reel. Similarly, upon detecting the alighting of a passenger, the reel changer interrupts a normal reel with an exit reel. If no intro or exit loop is defined, the reel changer disables itself and the normal reel runs continuously when a passenger is on board. All reels will stop playing when no passenger is in the vehicle.

Further, in the step of smart media generation, step 3040, the MM player detects a smart media slot, and builds appropriate media contents, for example referring to personal information of a driver, map of surroundings, meter amount, and the like. The following smart media types are optionally used in smart media generation. Driver Photo smart media type triggers display of driver's photo and driver's personal details, if installed. The Map type triggers the display of a map on the rear seat display. The passenger will be shown a "bread crumb" trail from their pickup location to the present location. With Meter Information, provided that the vehicle is equipped with a smart meter, the display of the meter information on the MM-player will be triggered. With Passenger Info, provided that passenger info feed is available, passenger related information will be displayed on the MM player. This information optionally includes updates on a passengers departing flight, the passenger being bound on a trip to an airport. Similar and related smart media types are Sports, Financial, Weather, and News. The smart media generation offers a unique possibility for dynamically personalizing transportation in a rental vehicle. At the same time, the display of smart media increases a passenger's interest level in the messages displayed on the MM-system messaging device 200, therefore increasing the impact of advertisements shown on the MM-system messaging device 200.

Figure 3B:
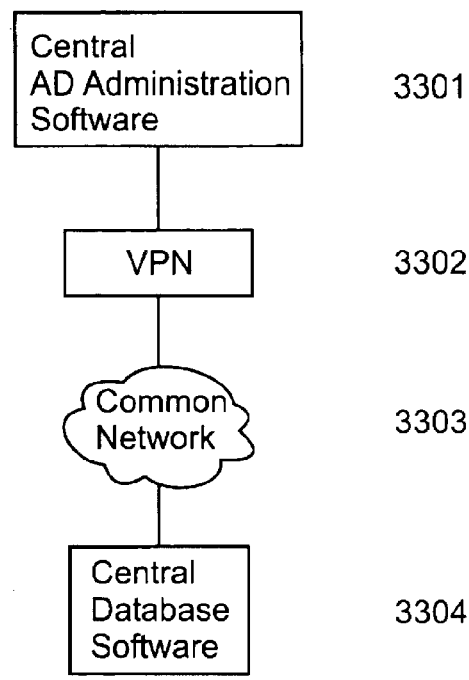
FIG. 3b shows a schematic diagram of a software architecture for setting up a dynamic mobile media reel.

Referring now to FIG. 3b, shown is a schematic diagram of a software architecture for a central message management system used by an Advertising Administrator to compose a DMMR. Central Administration software 3301 is in communication with virtual private net (VPN) software 3302. In this example, the Central Administration software 3301 is Central Advertising Administration software. The VPN software in communication with Central Advertising Database software 3304, the communication established by means of a common network 3303 such as the Internet, or a local area network In this example, the Central Database software 3304 is Central Advertising Database software. Preferably, the Central Database software 3304 is implemented using a structured query language such as MySQL, running under a UNIX type operating system such as LINUX. When setting up DMMR, the Central Advertising Administration Software is used to create a certain loop architecture for the DMMR. A Normal Loop for example comprises 180 timeslots at 5 second per slot, resulting in play duration of 900 seconds. Associated with each advertisement are a start date, an end date, a run time, and a starting slot number. For instance, if an advertisement has slot number 8 associated with it and runs for 15 seconds then the advertisements takes up slots 8 through 10. Other architectures of a "normal loop" are possible, and not to be excluded from the present invention. An Introductory Loop is set up in a fashion similar to a "normal loop". In case that the MM-system messaging device 200 is in communication with a meter of a rental care, the "introductory loop" commences playing when the meter is activated. This way, whenever a passenger enters a rental vehicle and the driver of the rental vehicle activates the meter, the passenger is presented with the "introductory loop". Optionally, the passenger boarding is signaled by an action taken by the driver when the meter is not connected. A Filler Loop differs from a "normal loop" in that there are no slot numbers associated with an advertisement being part of the "filler loop". When the DMMR runs across an empty slot in the "normal loop", the DMMR picks an advertisement from the "filler loop" Preferably, the selection from the "filler loop" is a random selection. A Time Sensitive Loop does not have a slot number associated with it; it will execute between specific times of the day. For instance, an advertisement has the time ranges 10:00 to 13:00 and 15:00 to 21:00 associated with it, which means that the advertisement executes from 10:00 am to 1:00 pm and 3:00 pm to 9:00 pm. Similarly, a Location Loop does not have a slot number associated with it; it will execute when the rental vehicle is in a specific location. For example, an advertisement optionally has associated with it one or more latitude/longitude/radius combinations.

Figure 3C:
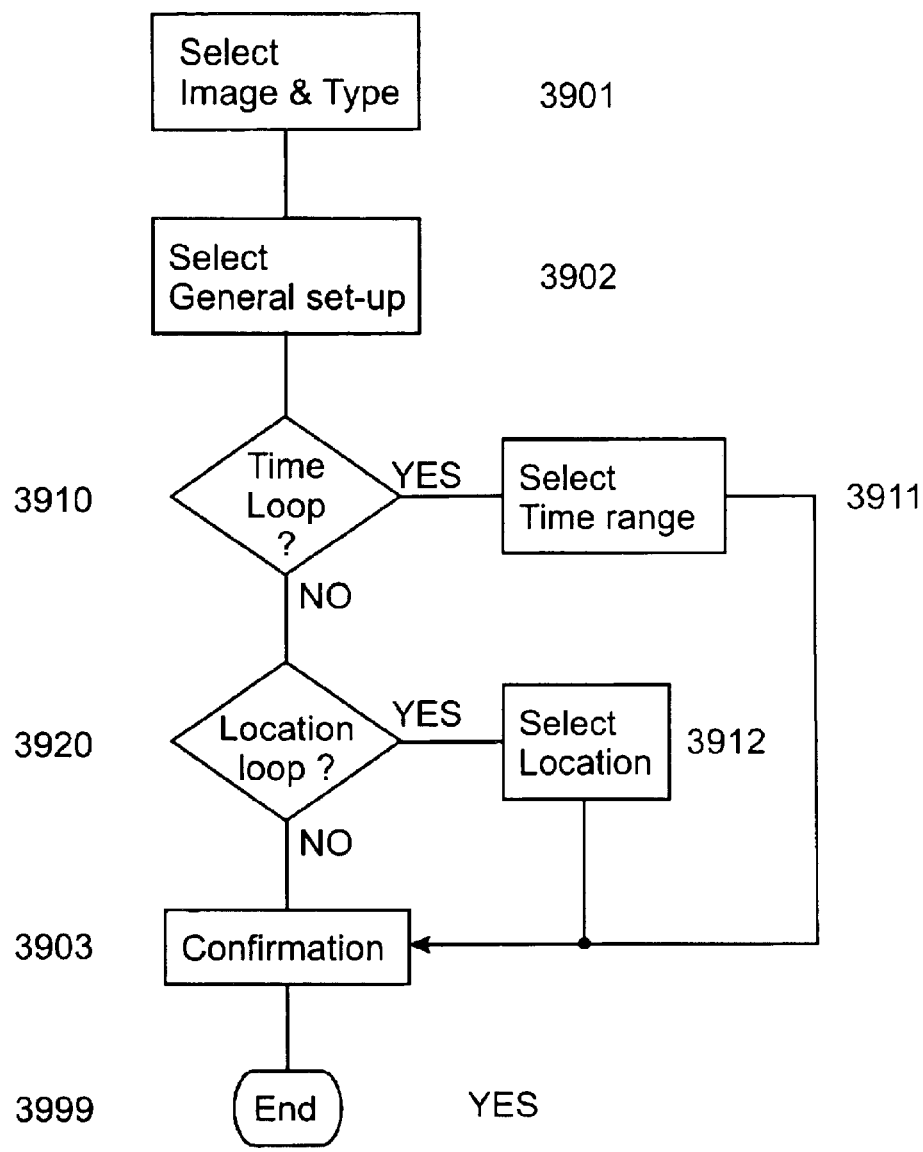
FIG. 3c shows a flow chart illustrating a method of assigning an advertisement to a dynamic mobile media reel.

Each advertisement to be displayed on the MM-system messaging device 200 has a variety of characteristics associated with it, the characteristics derived from the designated loop type of an advertisement. Exemplary characteristics are slot number, start date, end date, run time, start time, end time, latitude, longitude, and radius. An Advertising Administrator has to possibility to create different DMMR, according to certain requirements of a customer. Referring now to FIG. 3c, shown is a flow chart illustrating a method of assigning an advertisement to the DMMR. In step 3901, an advertisement is selected. Preferably, the advertisement is selected according to its media properties, depending on the type of DMMR being created. Next, a general setup for an advertisement is established, step 3902. The general setup comprises information about start date, end date, run time, and frequency of display. In a decision step 3910 it is established whether the advertisement is part of a time loop. If the decision is positive, a time range is selected, step 3911, and a confirmation step 3903 is reached. If the decision is negative, a further decision step 3920 follows, establishing whether the advertisement is part of a location loop. If yes, a location is selected, step 3912, if no, the confirmation step 3903 is reached. After confirmation, a finishing step 3999 is executed. Depending on the confirmation step, the setup of the advertisement is either committed or discarded. Optionally, when setting up a DMMR containing a plurality of advertisements, information regarding a target fleet is used in selecting particular advertisements to be incorporated into the DMMR.

Once a DMMR is composed, it is delivered to the MM-system messaging device 200. The Central Administration software 3301 is optionally connected to a wireless communication device for transmitting the DMMT to MM-system messaging devices 200. Alternatively, the Central Administration software 3301 is connected to a compact flash card burner, for creating a compact flash card comprising the DMMR, the compact flash card for being distributed to MM-system messaging devices 200.

In an embodiment of the instant invention, the MM-system messaging device 200 communicates to the dispatch system 170 details of display of specific media items. The dispatch system 170 then generates statistics of the potential "face time" of a media item. The statistics also include data such as the number of vehicles active on IMMDS per day, and amount of time passengers are in the back seat of vehicles per day. The statistics therefore provide valuable information for an Advertiser 120 as well as for a costumer 180. The statistics are provided to the Central Advertising System 150, where they are accessible over the AP-LAN 60 for the Advertiser 120 and the customer 180.

In another embodiment of the invention, the statistics are directly retrieved from the MM-system messaging device 200, the MM-system messaging device 200 located in a vehicle. The quality and granularity of the statistics are optionally improved when the statistics are directly retrieved from the vehicle. Furthermore, the statistics optionally serve as a basis for estimating a cost for the advertiser to run a certain media item on IMMDS.

Figure 4:
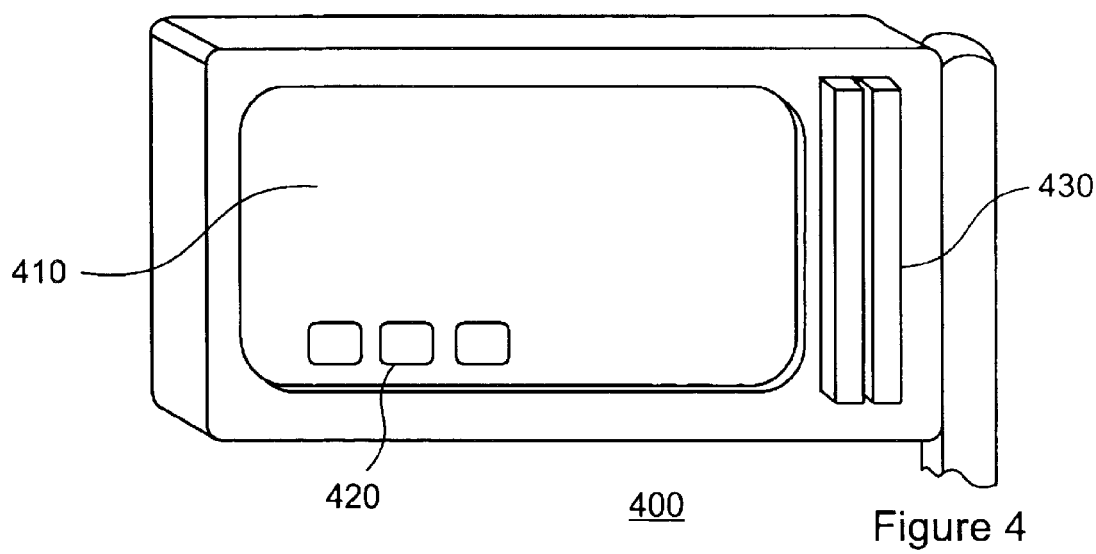
FIG. 4 shows a schematic diagram of an interactive video display unit.

In yet another embodiment of the invention, the MM-system messaging device 200 serves as an interactive messaging device. Referring now to FIG. 4, a schematic diagram of an interactive video display unit (IVDU) 400 of the MM-system messaging device 200 is shown. Advertisement and messages are shown on a screen 410 of the IVDU 400. Interaction buttons 420 allow a passenger to interact with the MM-system messaging device 200. The interaction buttons 420 are preferably but not exclusively simple push buttons, or touch screen buttons. For example, when an advertisement arouses the interest of a passenger, the passenger uses an interaction button 420 to freeze the display of the advertisement, in order to study in more detail the information presented in that advertisement. Optionally, the passenger activates another interaction button 420 in order to retrieve more detailed information regarding a specific advertisement. Preferably, the DMMR is set up so that an advertisement is allotted a short play duration, to enable display of a large number of advertisements optionally being of interest to a passenger. When an interaction button 420 is activated, the reel changer switches from the normal reel to a designated detail reel, and displays detailed information relating to a particular advertisement. A person of skill in the art easily envisions other types of passenger interaction. For example, when a map of the surroundings is displayed on the screen 420, the interaction buttons 420 allow a passenger to change the center point of the map, or to rescale the map. Optionally, the IVDU is equipped with a card reader 430 for reading magnetic cards such as credit cards, debit cards, and the like.

In case the MM-system is coupled to an IVDU 400 as well as to a printing device, a passenger optionally uses interaction buttons 420 to trigger display on the printing device in dependence on messages displayed on the screen 410 of the IVDU 400. For example an advertisement relating to a specialty store in close relationship to a destination of the passenger is displayed, the advertising comprising a list of items on sale. The passenger requests a print-out of the list of items on sale, using an interaction button. Print-outs requested in response to a message displayed on the screen of the IVDU are not restricted to lists of special offers for items on sale, but also include coupons, map information, and the like.

In case the MM-system messaging device 200 is in communication with a meter device of a rental vehicle, the cost of the trip is displayed on the IVDU, and the passenger is presented with an option to pay with his or her credit card for the trip. The passenger swipes his or her credit card through the card reader 430 and uses an interaction button 420 to conform the transaction. The MM-system messaging device 200 transmits the information to the wireless communication device, which communicates the information to appropriate processing locations.

In another embodiment of the present invention, the aspect of interactivity is accommodated by an exchange of messages between the MM-system messaging device 200 and possible location related to a journey of a passenger. In case the MM-system messaging device 200 is in communication with a GPS system, the MM-system messaging device 200 communicates with a destination of the passenger and providing information about the trip to the destination. The passenger destination replies and sends messages for display to MM-system messaging device 200, presenting the passenger with detail information about his or her destination.

This can be practiced by sending messages reflecting changes of current passenger location affecting passenger destination specifics to the passenger destination; the changes determined by a GPS device; sending messages relating to passenger destination specifics from the passenger destination to the wireless communication device; and displaying the messages relating to passenger destination specifics on the messaging device.

Figure 5:
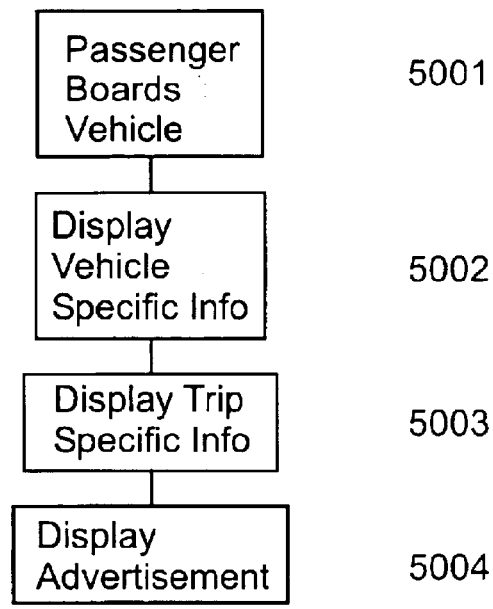
FIG. 5 displays a flow chart illustrating a method for displaying vehicle specific information according to the instant invention.

Different methods for displaying messages on the MM-system are optionally used in accordance with the instant invention. Referring now to FIG. 5, shown is a flow diagram illustrating display of vehicle specific messages on the MM-system messaging device 200. In step 5001, a passenger boards a rental vehicle equipped with a MM-system messaging device 200. Next, in step 5002, the MM-system messaging device 200 displays vehicle specific information, such as picture and personal data of the driver of the vehicle. In step 5003 the MM-system messaging device 200 displays information relating to the trip, such as a trail on a map of the surroundings and the like. Further in step 5004, advertisements are displayed.

Figure 6:
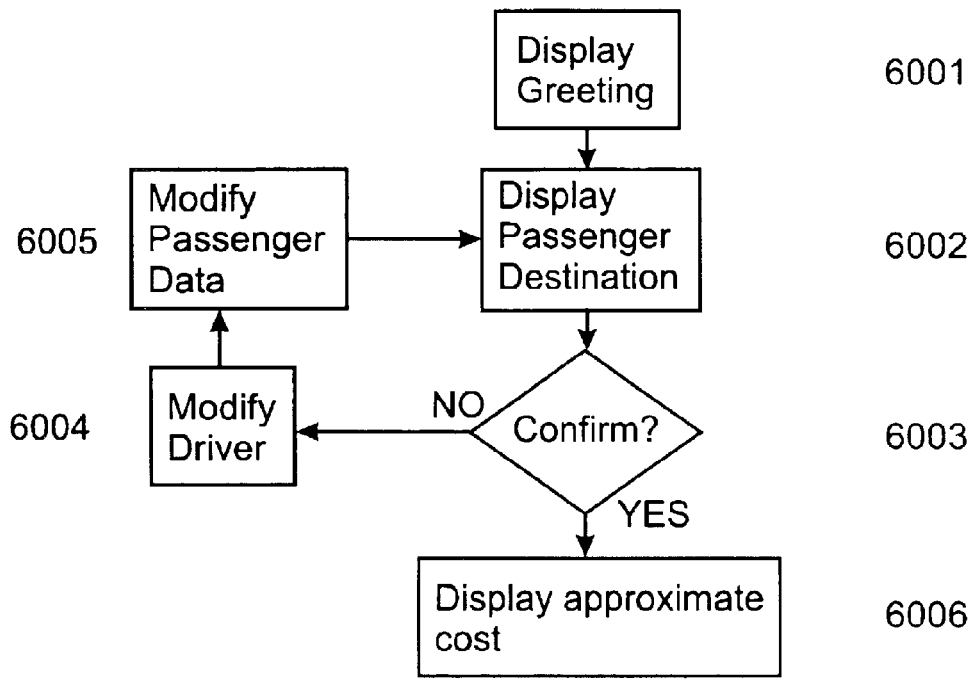
FIG. 6 displays a flow chart illustrating a method for displaying and confirming passenger destination information according to the instant invention.

With reference to FIG. 6, shown is a flow diagram illustrating a method for passenger destination confirmation according to the instant invention. In step 6001, the MM-system messaging device 200 displays a greeting message, when a passenger has boarded a vehicle. Next, in step 6002, the address of a passenger destination is displayed on the MM-system messaging device 200. The address of the passenger destination is for example retrieved from a dispatch system, or it is manually entered into the MM system. Next, in step 6003, the passenger is asked to confirm the address displayed. Preferably, the passenger uses interaction buttons to communicate his or her decision. If the address is incorrect, the driver of the vehicle is notified, step 6004. The driver then asks the passenger for the correct address, and modifies the destination address, step 6005. After step 6005, the procedure steps back to step 6002. If the passenger confirms the address, the driver commences a journey to said address. In step 6006, specifics relating to an approximate cost of transportation are displayed on the MM-system messaging device 200.

Figure 7:
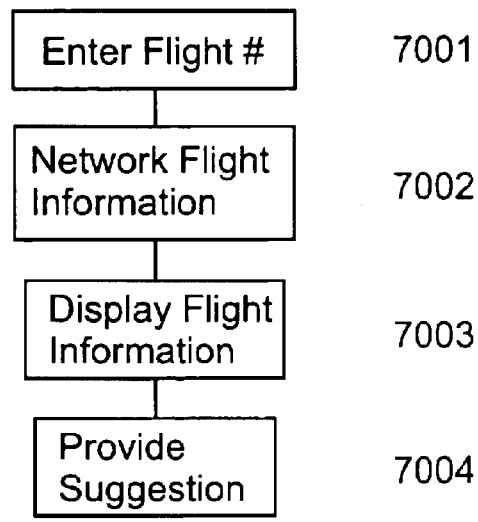
FIG. 7 displays a flow chart illustrating a method for displaying flight information according to the instant invention.

FIG. 7 illustrates a method for displaying flight information on the MM-system messaging device 200, and is preferably used for a trip to an airport, when a passenger is bound for a certain flight. In step 7001, a flight number is entered into the MM system. The flight number is for example transmitted by the dispatch system, or is manually entered. Next, in step 7002, flight information is retrieved from the airport. Using for example the wireless communication device, a communication is established between the vehicle and the airport. Next, in step 7003, the flight information is displayed on the MM-system messaging device 200. When the displayed flight information indicates a delay in departure, the passenger is provided with suggestions for alternative activities to bridge the time gap, step 7004. For example, on the MM-system messaging device 200 is offered a suggestion to visit a shopping mall located in close vicinity to the present location of the vehicle. Preferably, these suggestions are selected using information retrieved from the GPS system as well as map information stored within the MM-system. The passenger optionally uses an interaction button to communicate his or her decision to the MM-system.

Figure 8:
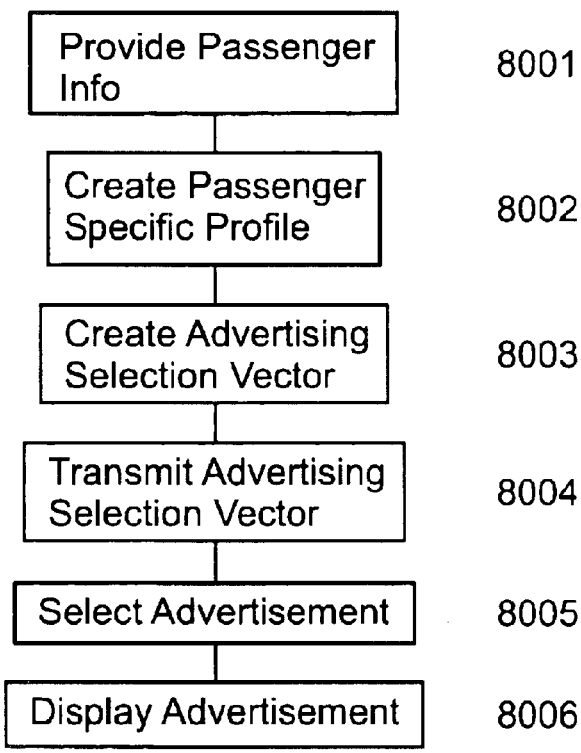
FIG. 8 displays a flow chart illustrating a method for use of an advertising selection vector information according to the instant invention.

When providing passenger specific information from the dispatch system to the MM-system, the passenger specific information used for selecting messages to be shown on the MM-system messaging device 200, the passenger specific information is advantageously provided as a pointer, or a vector. For example, when selecting an advertisement for display on the MM-system messaging device 200, an advertising selection vector is provided to the MM-system. The advertising selection vector is for selecting specific class of passengers, and for selecting advertisements to be of special interest for the selected class of passenger. For example, female passengers between thirty and thirty-five years of age belong to a passenger class 3A. An advertising selection vector pointing to class 3A is transmitted to the MM-system. Preferably, advertisements contained with the DMMR are associated with at least one passenger class, and only the advertisements referring to passenger class 3A are displayed on the MM-system messaging device 200. Referring now to FIG. 8, shown is a flow diagram illustrating a method of selecting advertisements according to an advertising selection vector in accordance with the present invention. In step 8001, a dispatch system is provided with passenger specific information. In step 8002 a passenger specific profile is created based on the passenger specific information. For example, information regarding age, gender, profession, and the like are reflected in the passenger profile. An advertising selection vector is determined based on the passenger profile, step 8003. Next, in step 8004, the dispatch system transmits to the MM-system the advertising selection vector. In step 8005, a DMMR selects advertisements for display according to the advertising selection vector. In step 8006, the selected advertisements are then displayed on the MM-system messaging device 200.

The method described above in connection with FIG. 8 is not restricted to and advertising selection vector. It equally applies to other vectors or pointers as well. The other vectors or pointers can be used to select other messages for display, as for example real time messages, dealing with news messages, sport events, and the like.

Although the present invention has been described with respect to specific embodiments thereof, various changes and modifications are optionally carried out by those skilled in the art without departing from the scope of the invention. Therefore, it is intended that the present invention encompass such changes and modifications as fall within the scope of the appended claims.

What is claimed is:

1. A method for dynamically personalizing transportation in a vehicle, the method comprising the steps of:
   providing a vehicle comprising:
      a messaging device for displaying messages, for storing messages, and for storing information relating to messages displayed, and
      a wireless communication device for receiving and sending messages, the wireless communication device in communication with the messaging device;
   providing a dispatch system for managing passenger allocation to the vehicle, the dispatch system in communication with the wireless communication device;
   providing a data storage medium in communication with the dispatch system;
   receiving passenger specific information at the dispatch system;
   providing data relating to the passenger specific information from the dispatch system to the messaging device via wireless communication and the wireless communication device;
   selecting at least a message based on the data for display on the messaging device; and
   displaying the at least a message on the messaging device;
      wherein the data comprises an advertising selection vector, and wherein the at least a message is selected according to the advertising selection vector;
   and further comprising the steps of:
   providing a GPS communication device in communication with the wireless communication device,
   sending messages from the wireless communication device to the passenger destination, the messages reflecting changes of current passenger location affecting passenger destination specifics; the changes determined by the GPS communication device;
   sending messages relating to passenger destination specifics from the passenger destination to the wireless communication device; and
   displaying the messages relating to passenger destination specifics on the messaging device.

2. A method according to claim 1, wherein the data includes passenger destination information.

3. A method according to claim 2, wherein in the step of selecting at least a message, a selection is made from a plurality of messages each stored in association with content data for use in selecting between the plurality of messages in dependence upon passenger destination information.

4. A method according to claim 3, wherein the at least a message comprises an approximate cost of a trip from a start to a destination based on the destination information.

5. A method according to claim 1, wherein in the step of selecting at least a message, a selection is made from a plurality of messages each stored in association with content data for use in selecting between the plurality of messages in dependence upon passenger specific information.

6. A method according to claim 5, wherein the plurality of messages is provided by at least a message provider and comprising the step of:
   collecting statistic information regarding display of a message from the plurality of messages.

7. A method according to claim 6, comprising the step of providing the statistic information regarding the display of a message to the at least a message provider providing the message.

8. A method according to claim 5, wherein the plurality of messages is provided by at least a message provider and comprise at least an advertisement.

9. A method according to claim 5, wherein the plurality of messages is provided by at least a message provider including a real time content provider, and wherein the plurality of messages comprises messages relating to real time content.

10. A method according to claim 1, wherein the at least a message displayed comprises specific information relating to a current trip undertaken with the vehicle.

11. A method according to claim 10, wherein the at least a message comprises a distance traveled during the current trip.

12. A method according to claim 1, further comprising the steps of:
    determining passenger history data based on the passenger specific information provided to the dispatch system;
    storing the passenger history data within the dispatch system; and
    providing the passenger history data from the dispatch system to the messaging device.

13. A method according to claim 12, wherein the step of selecting at least a message is based on the passenger history.

14. A method according to claim 1, further comprising the steps of:
    providing at least a message relating to vehicle specific information to the messaging device; and
    displaying the at least a message on the messaging device.

15. A method according to claim 14, wherein the vehicle specific information relates to personal characteristics of a driver of said vehicle.

16. A method according to claim 14, wherein the vehicle specific information relates to a phase of a journey currently undertaken by said vehicle.

17. A method according to claim 1, wherein the step of selecting at least a message is based on information obtained by the GPS communication device.

18. A method according to claim 1 further comprising the step of:
    displaying on the messaging device information relating to the current journey undertaken, the information determined by the GPS communication device.

19. A method according to claim 18, wherein the information relating to the current journey comprises map information of a surrounding area.

20. A method according to claim 1, wherein the step of displaying the at least a message is subject to the consent of a passenger of the vehicle.

21. A method according to claim 1, further comprising the step of:
adjusting the messaging device for viewing the messages displayed on the messaging device,
wherein the messaging device comprises a passenger seat display, the passenger seat display for displaying the at least a message, the passenger seat display comprising an adjustable video display unit mounted to a floor section of the vehicle, the video display unit adjustably mounted for aligning a normal direction vector of the video display unit with a direction of view of a passenger positioned in a passenger seat.

22. A method for dynamically personalizing transportation in a vehicle, the method comprising the steps of:
providing a vehicle comprising a messaging device for displaying messages, for storing messages, and for storing information relating to messages displayed;
providing passenger specific information to the messaging device;
selecting at least a message based on the passenger specific information for display on the messaging device;
selecting at least another message independent from the the passenger specific information, and
displaying the at least a message and the at least another message on the messaging device;
and further comprising the steps of:
providing an advertising selection vector; and
selecting at least a message according to the advertising selection vector;
providing a GPS communication device and a wireless communication device, the wireless communication device in communication with the messaging device; and
sending messages from and receiving messages at the wireless communication device, the messages relating to the at least a message displayed on the messaging device;
sending messages from the wireless communication device to the passenger destination, the messages reflecting changes of current passenger location affecting passenger destination specifics; the changes determined by the GPS communication device;
sending messages relating to passenger destination specifics from the passenger destination to the wireless communication device; and
displaying the messages relating to passenger destination specifics on the messaging device.

23. A method according to claim 22, wherein in the step of selecting at least a message a selection is made from a plurality of messages each relating to different passenger specific information and each stored within the messaging device.

24. A method according to claim 23, wherein the passenger specific information comprises personal characteristics of a passenger.

25. A method according to claim 23, wherein the plurality of messages is provided by at least a message provider.

26. A method according to claim 25, further comprising the step of:
collecting statistic information regarding display of a message from the plurality of messages.

27. A method according to claim 26, wherein the statistic information regarding the display of a message is provided to the at least a message provider providing the message.

28. A method according to claim 25, wherein the at least a message provider comprises an advertisement provider, and wherein the plurality of messages comprises advertisements.

29. A method according to claim 25, wherein the at least a message provider comprises a real time content provider, and wherein the plurality of messages comprises messages relating to real time content.

30. A method according to claim 23, wherein the passenger specific information comprises a passenger destination.

31. A method according to claim 30, wherein the at least a message displayed on the at least a messaging device comprises information relating to the passenger destination.

32. A method according to claim 22, wherein the step of selecting at least a message is based on information obtained by the GPS communication device.

33. A method according to claim 22; further comprising the step of:
displaying on the messaging device information relating to the current journey undertaken, the information determined by the GPS communication device.

34. A method according to claim 33, wherein the information relating to the current journey comprises map information of a surrounding area.

35. A method according to claim 23, further comprising the steps of:
providing at least a message relating to vehicle specific information to the messaging device; and
displaying the at least a message on the messaging device.

36. A method according to claim 35, wherein the vehicle specific information relates to personal characteristics of a driver of said vehicle.

37. A method according to claim 23, further comprising the steps of:
providing a printing device in communication with the messaging device;
providing a message from the messaging device to the printing device, and
printing the message provided from the messaging device to the printing device on the printing device.

38. A method according to claim 22, wherein the at least another message displayed comprises specific information relating to a current trip undertaken with the vehicle.

39. A method according to claim 38, wherein the at least another message comprises a distance traveled during the current trip.

40. A method according to claim 39, wherein the at least another message comprises an approximate cost related to the distance traveled during the current trip.

41. A method according to claim 22, wherein the at least another message is selected by a passenger of the vehicle, the at least another message selected in dependence on the at least a message.

42. A method according to claim 22, further comprising the steps of:
establishing a passenger history based on the passenger specific information provided to the messaging device; and
storing the passenger history within the messaging device.

43. A method according to claim 42, wherein in the step of storing the passenger history is stored within a storage medium internal to the messaging device.

44. A method according to claim 42, wherein in the step of storing the passenger history is stored within a storage medium external to the messaging device.

45. A method according to claim 42, wherein the step of selecting at least a message is based on the passenger history.

46. A method according to claim 22, wherein the step of displaying the at least a message is subject to the consent of a passenger of the vehicle.

47. A method according to claim 22, further comprising the step of:
adjusting the messaging device for viewing the messages displayed on the messaging device,
wherein the messaging device comprises a passenger seat display, the passenger seat display for displaying the at least a message, the passenger seat display comprising an adjustable video display unit mounted to a floor section of the vehicle, the video display unit adjustably mounted for aligning a normal direction vector of the video display unit with a direction of view of a passenger positioned in a passenger seat.

48. A method for dynamically personalizing transportation in a vehicle, the method comprising the steps of:
providing a vehicle comprising:
a messaging device for storing messages, for selecting messages, and for storing information relating to messages selected,
selecting at least a message with the messaging device;
providing a printing device in communication with the messaging device;
providing the at least a message from the messaging device to the printing device, and
printing the at least a message provided from the messaging device to the printing device
on the printing device; wherein the plurality of messages are provided by at least a
message provider and comprise at least an advertisement; further comprising the steps of:
providing a GPS communication device in communication with the wireless communication device,
sending messages from the wireless communication device to the passenger destination; the messages reflecting changes of current passenger location affecting passenger destination specifics; the changes determined by the GPS communication device;
sending messages relating to passenger destination specifics from the passenger destination to the wireless communication device; and
displaying the messages relating to passenger destination specifics on the messaging device.

49. A method according to claim 48, wherein in the step of selecting at least a message, a selection is made from a plurality of messages each stored in association with content data for use in selecting between the plurality of messages in dependence upon passenger destination information.

50. A method according to claim 44, wherein the at least a message comprises an approximate cost of a trip from a start to a destination based on the destination information.

51. A method according to claim 48, wherein in the step of selecting at least a message, a selection is made from a plurality of messages each stored in association with content data for use in selecting between the plurality of messages in dependence upon passenger specific information.

52. A method according to claim 51, further comprising the steps of:
providing an advertising selection vector; and
selecting at least a message according to the advertising selection vector.

53. A method according to claim 51, wherein the plurality of messages is provided by at least a message provider and comprising the step of:
collecting statistic information regarding selection of a message from the plurality of messages.

54. A method according to claim 53 comprising the step of providing the statistic information regarding the selection of a message to the at least a message provider providing the message.

55. A method according to claim 51, wherein the plurality of messages is provided by at least a message provider including a real time content provider, and wherein the plurality of messages comprises messages relating to real time content.

56. A method according to claim 48, wherein the at least a message printed comprises specific information relating to a current trip undertaken with the vehicle.

57. A method according to claim 56, wherein the at least a message comprises a distance traveled during the current trip.

58. A method according to claim 48, wherein the step of selecting at least a message is based on information obtained by the GPS communication device.

59. A method according to claim 48; further comprising the step of:
displaying on the messaging device information relating to the current journey undertaken, the information determined by the GPS communication device.

60. A method according to claim 59, wherein the information relating to the current journey comprises map information of a surrounding area.

61. A method according to claim 48, wherein the step of printing the at least a message is subject to the consent of a passenger of the vehicle.

62. A system for personalizing transportation in a vehicle, the system comprising:
a vehicle comprising a messaging device for storing, selecting, and displaying messages, and a wireless communication device, the wireless communication device in communication with the messaging device;
a central message management system comprising central administration software and central database software, the central message management system for storing messages and providing at least a message to the messaging device;
a dispatch system for sending information to the messaging device, the dispatch system in communication with the wireless communication device, the information for selecting messages to be displayed on the messaging device, and for providing real time content to the messaging device; wherein the messages displayed include advertisements; and
a GPS communication device in communication with the wireless communication device for determining changes of current passenger location affecting passenger destination specifics; wherein during use, a message reflecting the determined changes of current passenger location is sent from the wireless communication device to the passenger destination, and a message relating to destination specifics is sent from the passenger destination to the wireless communication device for display by the messaging device.

63. A system according to claim 62, wherein the messaging device comprises an adjustable video display unit mounted to a floor section of the vehicle, the video display unit adjustably mounted for aligning a normal direction vector of the video display unit with a direction of view of a passenger positioned in a passenger seat, the video display unit comprising a screen for displaying a video.

64. A system according to claim 63, wherein the video display unit is an interactive video display unit comprising at least an interaction button for interaction with the messaging device for selecting messages to be displayed on said messaging device.

65. A system according to claim 63, wherein the video display unit is an interactive video display unit comprising a card sweeping device for retrieving information from a magnetic card and transmitting the information to the wireless communication device.

66. A system according to claim 63, wherein the messaging device comprises a printing device for printing messages to be displayed on the messaging device.

67. A system according to claim 62, wherein the central database software comprises software for managing a plurality of advertisements, the advertisements provided by a central advertising site.

68. A system according to claim 62, wherein the central administration software comprises software for composing a multi media reel for being displayed on the messaging system, the multi media reel comprising advertisements stored by the central database software, the advertisements arranged in a loop structure determining the display of the advertisements.

69. A system according to claim 68, wherein the loop structure relates to a display of advertisements in relation to a time of day.

70. A system according to claim 68, wherein the loop structure relates to a display of advertisements in relation to a location of the vehicle.

71. A system according to claim 62, wherein the central message management system comprises a device for providing at least a message to the messaging device using wireless communication.

72. A system according to claim 62, wherein the central message management system comprises a device for providing at least a message to the messaging device using a compact flash card.

* * * * *